Oct. 23, 1923.
C. G. CLEMENT
1,471,548
TWO-WHEELED TRAILER
Filed April 25, 1919
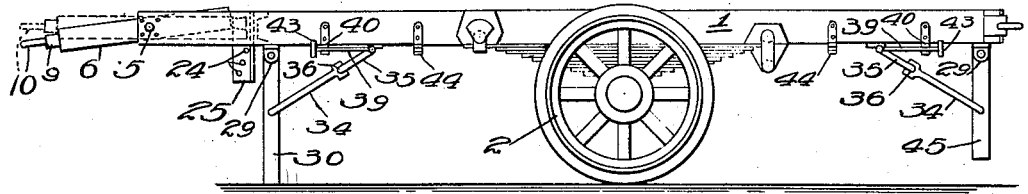
Fig.1
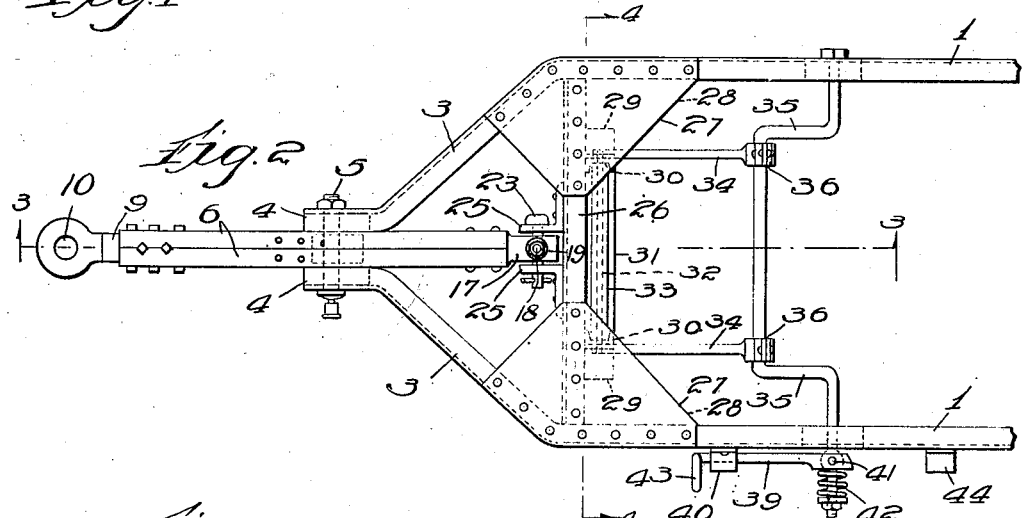
Fig.2
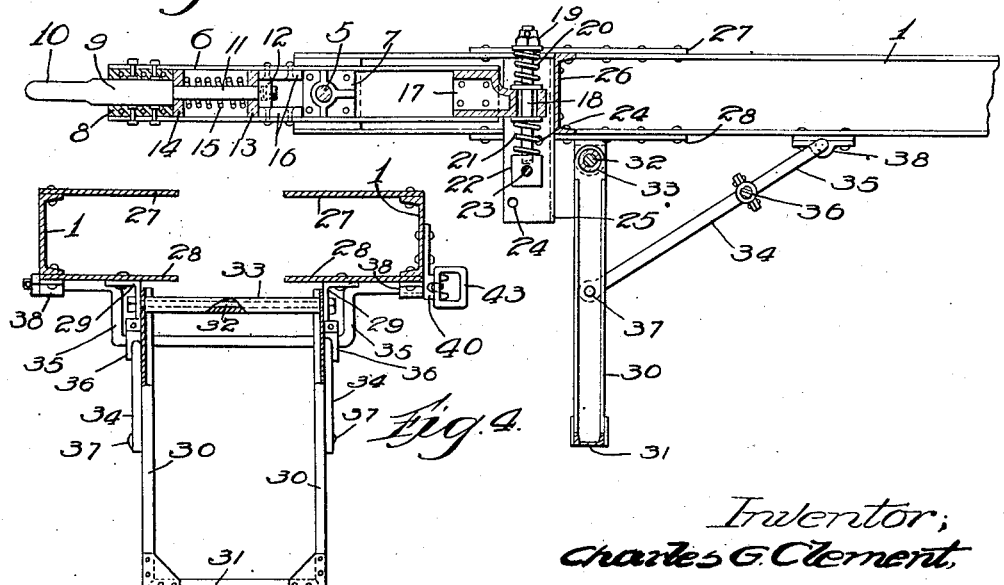
Inventor;
Charles G. Clement,
by Burton & Burton
his Attys.

Patented Oct. 23, 1923.

1,471,548

UNITED STATES PATENT OFFICE.

CHARLES G. CLEMENT, OF EDGERTON, WISCONSIN, ASSIGNOR TO HIGHWAY TRAILER COMPANY, OF EDGERTON, WISCONSIN, A CORPORATION OF WISCONSIN.

TWO-WHEELED TRAILER.

Application filed April 25, 1919. Serial No. 292,580.

*To all whom it may concern:*

Be it known that I, CHARLES G. CLEMENT, a citizen of the United States, residing at Edgerton, in the county of Rock and State of Wisconsin, have invented certain new and useful Improvements in Two-Wheeled Trailers, of which the following is a specification, reference being had to the accompanying drawings, forming a part thereof.

The purpose of this invention is to provide a trailer vehicle with coupling means which shall be adjustable for connecting the trailer with any one of a number of tractor vehicles having cooperating coupling means located at various heights from the ground. It also aims to provide the trailer with special cushioning means for absorbing shocks when it is applied to a two-wheeled trailer, and further supplies auxiliary supporting means for such two-wheeled trailer when it is detached from the tractor vehicle. The invention consists in the various features and elements of construction hereinafter described and shown in the drawings as indicated by the claims.

In the drawings:

Figure 1 is a side elevation of the frame and running gear of a two-wheeled trailer embodying this invention.

Figure 2 is a top plan view of one end of the frame shown on a larger scale to further illustrate the coupler and adjusting means for the supplemental supporting device.

Figure 3 is a vertical section taken as indicated at line 3—3 on Figure 2.

Figure 4 is a transverse section taken as indicated at line 4—4 on Figure 2.

As shown in the drawings the trailer frame, 1, is mounted on a single pair of wheels, 2, and at one end the side members of the frame are bent toward each other obliquely at 3, terminating in short parallel portions 4, spaced apart and provided with a horizontal pivot, 5, on which there is carried a draw bar, 6. The draw bar may be made up of a pair of inwardly facing channel sections with a cast metal block, 7, secured between them and bored out to form a bearing on the pivot, 5. At the forward end, additional filler blocks, 8, form a guideway for the tongue, 9, of a coupler member comprising a simple ring or eye, 10, but having a reduced portion, 11, within the draw bar provided with a terminal nut, 12, and reaction plates or washers, 13 and 14, between which is a coil spring, 15, carried on the reduced portion, 11. Thus any jerking in a forward direction communicated through the coupler is cushioned by compression of the spring, 15, reacting against the filler block, 8, while shocks in the opposite direction are similarly cushioned by compression of the spring against additional filler blocks or guide members, 16, similarly riveted into the channel members which comprise the draw bar.

At the rear end of said draw bar, 6, a fitting, 17, is secured in the channels, and its extending vertically apertured portion embraces a guide rod or bolt, 18, with which it is yieldingly engaged by virtue of the nut, 19, on the upper end of the bolt, retaining a cushion spring, 20, above said extending portion of the member, 17, while a cushion spring, 21, just below it is stopped against the head, 22, of the guide, 18. Said head, 22, is pivotally anchored to the frame of the trailer by a cross pin, 23, extending through one pair of the series of holes, 24, in vertically extending members, 25, which are secured to the cross member, 26, of the frame. By virtue of the cushion springs, 20 and 21, any up-and-down shocks resulting from the bumping or jolting of the truck ahead to which the coupler eye, 10, is attached, will be absorbed or lessened before they are transmitted to the frame of the trailer because the draw bar, 6, is at all times free to rock upon the pivot bolt, 5, except as it may be checked yieldingly by these cushion springs, 20 and 21. It is also evident that the relatively heavy trailer vehicle being thus yieldingly connected to the draw bar and coupler instead of rigidly, such shocks, especially when sudden or in the nature of hammer blows, will be less likely to injure the coupler bar itself.

Further use is made of the pivotal mounting of the draw bar, 6, at the pivot bolt, 5, by providing in the vertical members, 25, the series of holes, 24, so that the draw bar may be tilted upon its pivot, 5, to accommodate the forward eye, 10, to coupling connections at various heights from the ground, as they are likely to be found on a wide range of tractor vehicles of different makes and various types. This adjustment is readily accomplished by removing the bolt and re-inserting it through the desired aperture, 24, any quick detachable retainer, such as a nut or cotter pin being provided to secure it.

In a two-wheeled trailer vehicle, such as indicated in the drawing, it is necessary to provide some supplemental support in addition to the wheels, 2, for keeping the frame member, 1, in substantially horizontal position, if the trailer is to be loaded or unloaded when detached. At the corner the vehicle frame is made more rigid by the use of the gusset plates, 27 and 28, and the plates, 28, also serve for attachment of brackets, 29, to which there is hinged a rest comprising vertical channel members, 30, and a cross member, 31, at the bottom, connecting them. At the upper ends of said members, 30, a cross rod, 32, and spacing tube, 33, are secured, the rod, 32, extending pivotally through the brackets, 29, to form a hinged connection. As indicated in Figure 3, the rest is held in operative position, by means of a brace composed of a pair of struts or links, 34, connected to cranks, 35, by engagement with the crank wrist, 36, thereof, thus forming as a whole a jointed diagonal strut connected to the rest members, 30, at pivots, 37, and to the frame member, 1, at the journal bearings, 38, for the crank shaft whose arms 35, constitute elements of construction. The shaft is provided with an operating handle, 39, for which a retainer fork, 40, is secured to the side frame, 1, so as to hold the handle arm, 39, against rotation when parts, 34 and 35, are in bracing position as shown in Figure 3. The handle arm, 39, is pivotally connected to the crank shaft at 41, and yieldingly retained in the fork 40, by means of a compression spring, 42, but the operator, by grasping the square eye, 43, serving as a hand hold, may easily withdraw the end of the arm, 39, from the fork, 40, and by rotating it about one-half revolution may engage it in the other fork, 44. This movement serves to hold the jointed brace and also the legs, 30, of the rest in horizontal position directly underneath the frame members, 1, and to lock the parts in this position until they are again required. A similar rest may be provided at the rear end of the frame members, 1, and will be brought into use simultaneously with that at the forward end, but its vertical leg members, 45, should be somewhat shorter than those at 30, to insure that the rest may be unfolded, even if the trailer stands on somewhat uneven ground. This will also permit moving the trailer about by hand, whereas a full length rest would be a considerable embarrassment to such movement.

I claim:—

1. In a trailer vehicle comprising a frame and a single pair of wheels upon which it is mounted, a draw bar attached intermediate its ends to the frame by a horizontal pivot, springs between which the rear end of said draw bar is yieldingly checked in its tendency to rock upon said pivot, together with a rod passing through said springs and loosely engaging the draw bar, and a pair of vertical members on the frame between which the rod is mounted by attachment of its lower end thereto, said members having a plurality of holes at different heights, and means associated with the rod for engagement with said holes selectively to adjust the draw bar about its pivot.

2. In a trailer vehicle, a frame and a draw bar connected intermediate its ends to the frame by a horizontal pivot, the outer end of said draw bar being formed with a coupling head, and the inner end being connected to the frame by vertically adjustable means for varying the distance of the coupler head from the ground, said means including a vertically extending member rigid with the frame, having a series of vertically distributed apertures, a vertically extending guide member slidably engaging the inner end of the draw bar, and provided with vertically separated stops, and cushion springs between which said end of the draw bar is yieldingly checked, one end of said guide member having a transverse aperture, and a bolt to engage said aperture and one of the series of apertures in the rigid vertical member adjustably anchoring said inner end of the draw bar.

3. In a trailer vehicle comprising a main frame, a single pair of road wheels, and a rest arranged to extend downwardly from the frame to supplement said wheels in supporting it, a draw bar provided at its outer end with a coupling head, and attached to the main frame by a horizontal pivot, together with adjustable anchoring means engaging said draw bar at a distance from its pivot, comprising a vertically extending member rigid with the frame, provided with a series of vertically distributed apertures, means yieldingly engaging the draw bar and having an aperture arranged to register with the said apertures when the draw bar is rocked upon its pivot, and a bolt to engage the aperture of said member and any selected aperture of said series for securing the draw bar in adjusted position.

In testimony whereof, I have hereunto set my hand at Chicago, Illinois, this 14th day of April, 1919.

CHARLES G. CLEMENT.